T. R. BROWN.
COMBINED CAR AND ELECTRIC COUPLING.
APPLICATION FILED JULY 13, 1916.
1,220,317.
Patented Mar. 27, 1917.
6 SHEETS—SHEET 1.
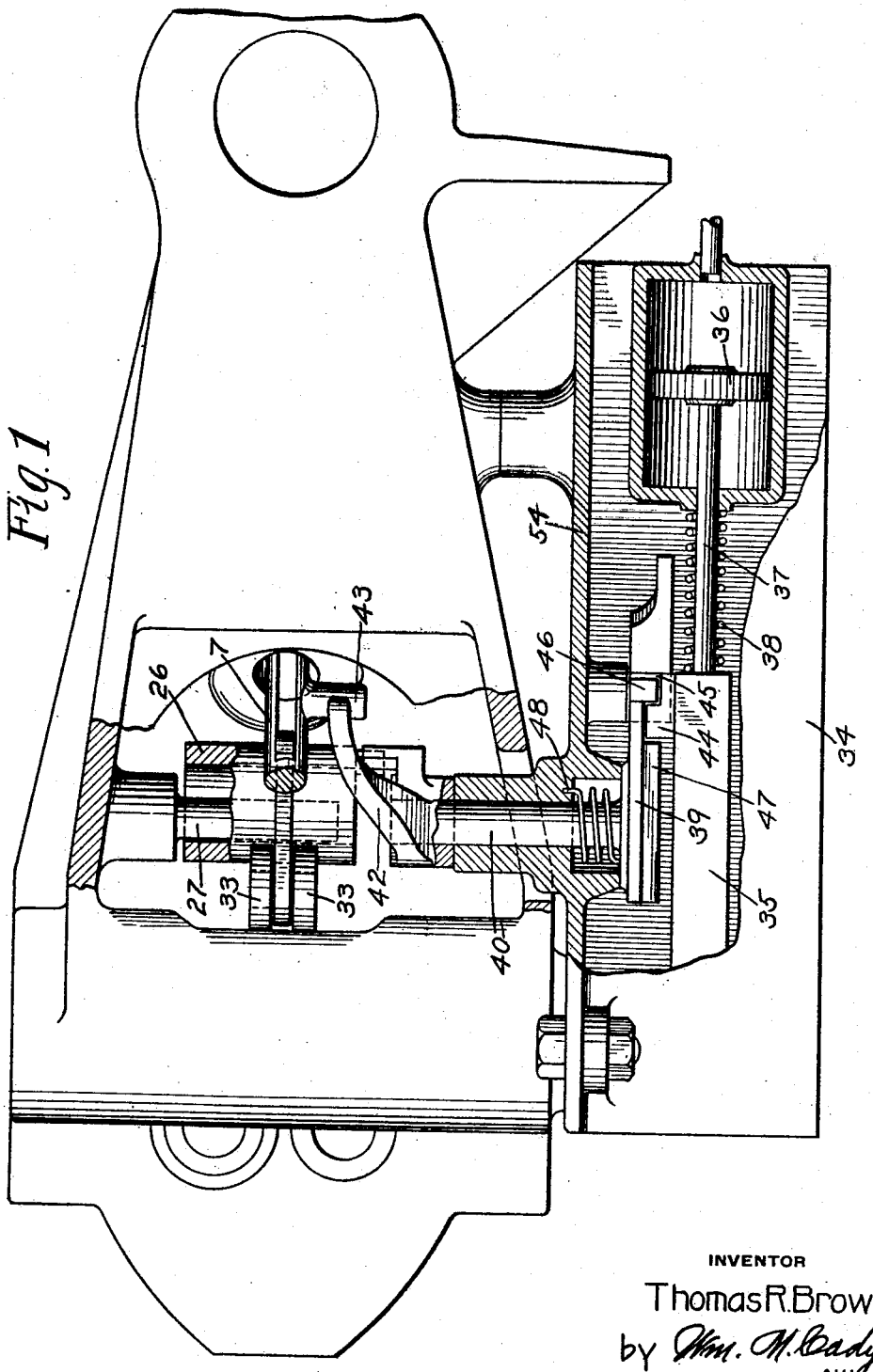
INVENTOR
Thomas R. Brown
by *Wm. M. Cady*
Att'y.

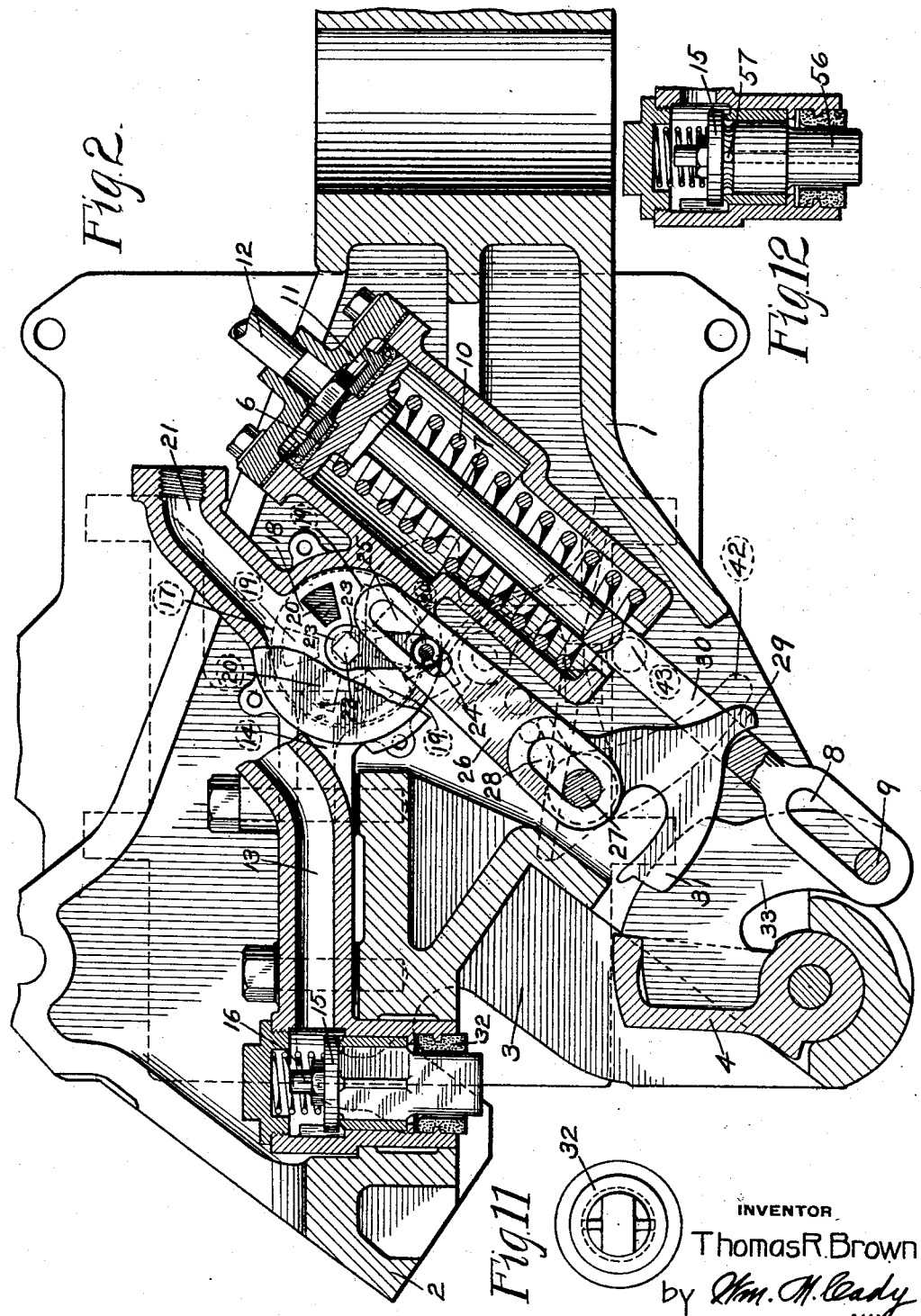

T. R. BROWN.
COMBINED CAR AND ELECTRIC COUPLING.
APPLICATION FILED JULY 13, 1916.
1,220,317.
Patented Mar. 27, 1917.
6 SHEETS—SHEET 3.
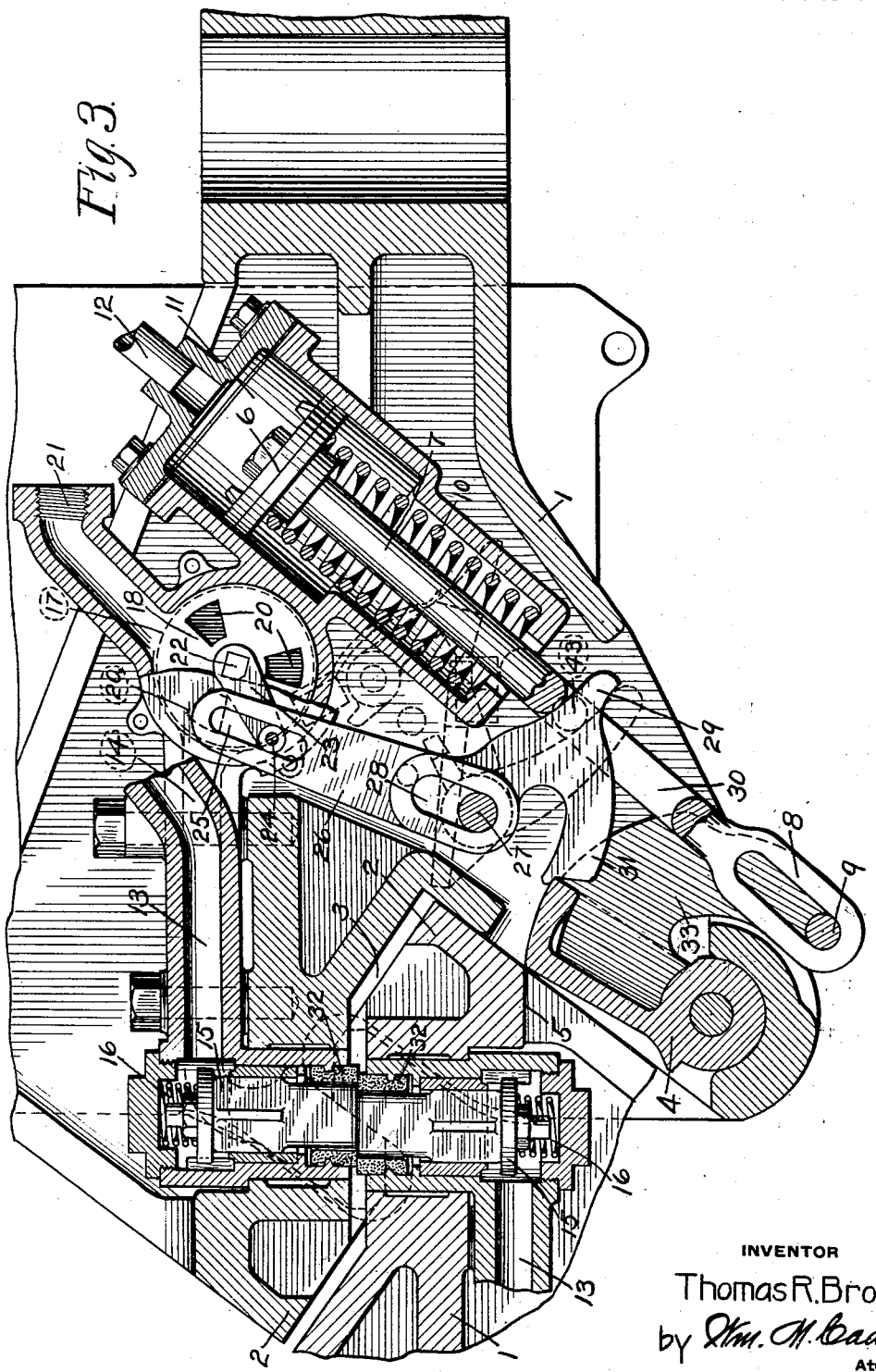
INVENTOR
Thomas R. Brown
by Wm. M. Cady
Att'y.

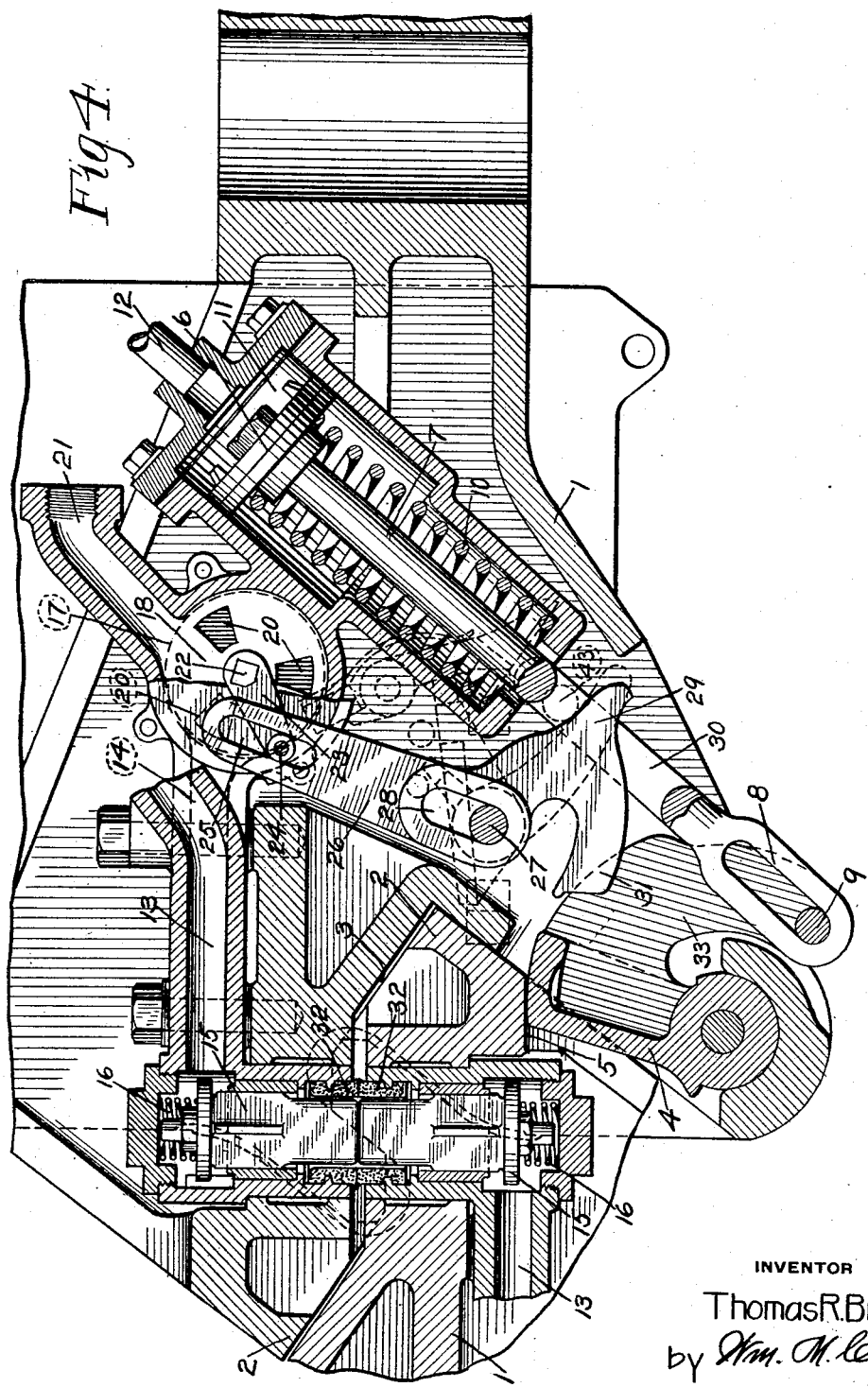

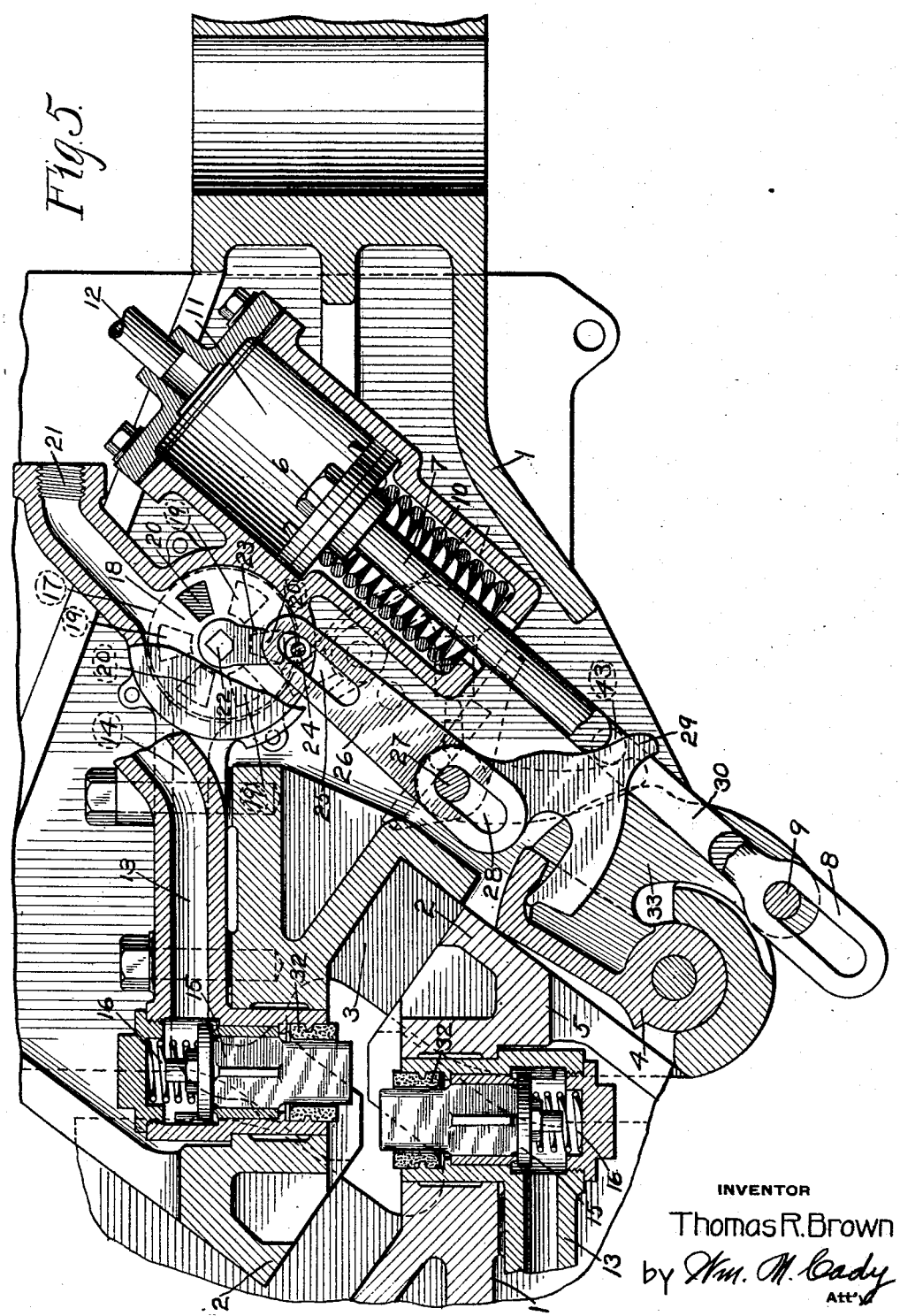

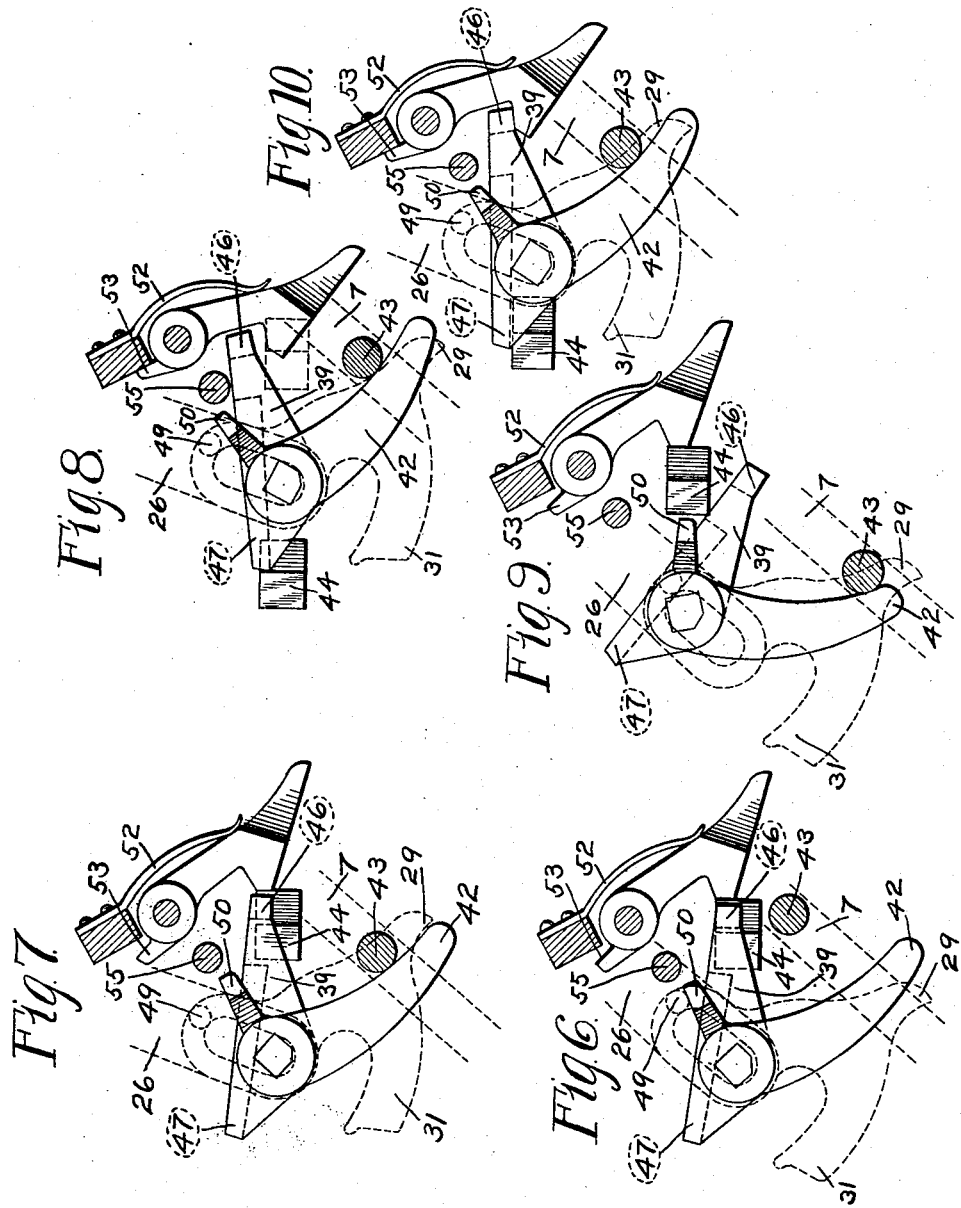

UNITED STATES PATENT OFFICE.

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

COMBINED CAR AND ELECTRIC COUPLING.

1,220,317.     Specification of Letters Patent.      Patented Mar. 27, 1917.

Application filed July 13, 1916. Serial No. 109,046.

*To all whom it may concern:*

Be it known that I, THOMAS R. BROWN, a citizen of the United States, residing at Sparkill, in the county of Rockland and State of New York, have invented new and useful Improvements in Combined Cars and Electric Couplings, of which the following is a specification.

This invention relates to coupling devices, and more particularly to a combined car, fluid pressure, and electric train wire coupler.

In my prior pending application, Serial No. 105,736, filed June 24, 1916, means are provided for insuring the movement of the contact carrier to release position before the coupler locks can be released and also for preventing the throwing of the contact carrier until the counterpart couplers have been fully locked together.

One object of the present invention is to provide mechanically operated means controlled by the coupler lock for accomplishing the above purposes.

Another object is to provide a conduit closing valve adapted to be mechanically controlled by the movement of the coupler lock.

Other objects and advantages will appear in the following more detailed description of the invention.

In the accompanying drawings; Figure 1 is an elevational view, partly in section, of a combined car, fluid pressure, and electric coupler embodying my invention; Fig. 2 a horizontal sectional view thereof, showing the parts in the uncoupled position; Fig. 3 a similar view, showing the parts in the act of coupling and just before the coupler lock snaps into locking position, a portion of the counterpart coupler being shown in position; Fig. 4 a similar view, showing the parts in fully coupled position; Fig. 5 a similar view, showing the parts in the act of uncoupling, with the coupler heads partly separated; Figs. 6 to 9 inclusive detail views, showing the relative positions of the interlocking mechanism corresponding respectively with Figs. 2 to 5 inclusive; Fig. 10 a similar detail view of the interlocking mechanism, in position for preventing the release of the coupler locks; Fig. 11 a face view of the supply conduit gasket opening, showing the tappet; and Fig. 12 a detail sectional view of a modified form of the conduit closing valve.

As shown in the drawings, the coupler may comprise a coupler head 1 having a projection 2 adapted to engage a recess 3 in a counterpart coupler when the cars are coupled together. A pivoted lock 4 is provided having a cam surface adapted to engage a corresponding curved surface 5 on the projection 2 of the counterpart coupler for locking the couplers together and the lock 4 is adapted to be operated by a piston 6 having a piston rod 7 with a slot 8 at the outer end for engaging a pin 9 carried by the lock 4. A spring 10 acts on piston 6 and tends to maintain the lock in its locking position and the piston is operated to release the lock by fluid under pressure admitted to the piston chamber 11 through pipe 12 which may be connected to a suitable valve for supplying and releasing fluid under pressure to and from the piston chamber 11.

The coupler is provided with one or more fluid conduits such as a fluid supply conduit 13 and a brake pipe conduit 14 which are arranged vertically and have gaskets 32 adapted to meet on a longitudinal vertical plane when counterpart couplers are coupled together.

The supply conduit may be provided with a closing valve 15 operated by a spring 16 and fluid pressure for closing the conduit when couplers are separated and according to my invention, the brake pipe conduit is controlled by a rotary valve 17 adapted to seat upwardly on the under face of the web 18 and having a plurality of ports 19 adapted in one position of the valve to register with corresponding ports 20 in the web 18. The conduit 14 opens to a chamber underneath the valve 17 and a passage 21 leading to the brake pipe opens to the chamber above the web 18, so that in the open position of the valve, communication is opened from passage 21 to conduit 14.

The rotary valve 17 is provided with an operating stem 22 which extends upwardly through the web 18 and is connected to an arm 23, having a pin 24 engaging a slot 25 in a lever 26.

The lever 26 is pivoted on a pin 27 which engages within a slot 28 of the lever and for operating the lever, a finger 29 is formed thereon and is adapted to project into a slot 30 provided in the rod 7. In order to interlock the movement of the rotary valve with the movement of the coupler lock under certain conditions, the lever 26 is also provided with a finger 31 adapted to engage the lock 4, the finger 31 being mounted between the web members 33 of the lock 4.

The electric train line coupler portion may comprise a casing 34 adapted to be secured to the under side of the coupler casting 1 and containing a movable contact carrier 35 adapted to be projected into a counterpart coupler for connecting the train line circuits between cars. The carrier 35 may be projected, as shown in Fig. 1 of the drawings, by means of a fluid operated piston 36 connected thereto by a rod 37 and having suitable springs 38 tending to return the carrier to neutral or release position.

In order to interlock the movement of the contact carrier with the movement of the coupler lock, a member 39 is provided which is adapted to be rotated by a shaft 40 extending upwardly through a bearing 41 in the casting 1 and having secured to its upper end an arm 42 adapted to engage a downwardly projecting pin 43 carried by the piston rod 7.

On the top of the contact carrier 35 there is mounted a block 44 having a rear depressed portion forming a recess 45 within which a downwardly projecting portion 46 of the member 39 is adapted to engage for preventing rearward movement of the carrier. A front projecting 47 carried by member 39 is arranged in the path of block 44 for preventing forward movement of the contact carrier.

A torsional spring 48 surrounds the shaft 40 and acts on the member 39, tending to rotate same in a direction opposite to that effected by the action of the piston rod 7.

In operation, with the coupler parts in the uncoupled position, shown in Fig. 2 of the drawings, the valve 15 is held closed by spring 16 and the fluid pressure in conduit 13, and the rotary valve 17 is held in the position shown by lever 26 engaging pin 24, so that ports 19 in the rotary valve are out of register with the ports 20 and consequently the brake pipe outlet is closed.

The spring 10 acts on piston 6 through rod 7 and pin 9 to hold the lock 4 in the uncoupling position.

If it is desired to couple up, counterpart couplers are brought together, so that the projection 2 of one coupler head enters the recess 3 of the counterpart head.

As the heads move into engagement, the lock 4 of each head is pushed back by the projection 2 of the counterpart head, the movement of the lock causing the piston 6 to be moved inwardly against the resistance of spring 10, until the rear portion of the lock engages the finger 31. Said finger is then moved rearwardly by the further movement of the lock, causing the lever 26 to be rotated on its pivot pin 27. The arm 23 is therefore turned, causing the rotation of the rotary valve 17 to the position shown in Fig. 3 of the drawings, in which the ports 19 register with ports 20, so that communication is opened from the brake pipe to the conduit 14. This opening is preferably arranged to occur just before the gaskets 32 engage, so that any particles of dirt or foreign matter will be blown out.

As the gasets come together, the projections on the closing valves 15 engage and push the valves of the counterpart couplers off their seats, so as to establish communication through the supply conduit 13 from one coupler to the counterpart coupler.

Finally, the lock 4 can slip past the projection 2, so as to engage the curved surface 5 of the counterpart head and thus lock the couplers together, the spring 10 acting through piston 6 and rod 7 to effect this movement of the lock. It will thus be seen that the opening of the brake pipe connection is automatically assured by the action of the coupler lock in coupling up.

Referring now to the operation of the interlock between the coupler and the electric contact carrier, it will be seen from Fig. 6 of the drawings, that when the coupler is in the uncoupled position, the interlock member 39 is in position, so that the block 44 engages between the projections 46 and 47 and consequently the contact carrier cannot be moved in either direction from the neutral or release position.

As the spring 48 tends to rotate the member 39 in a counter clock-wise direction, the movement may be limited to the desired position by providing a downwardly projecting pin 49 on the hub portion of the lever 26 which is adapted in the uncoupled position to engage a finger 50 carried by the arm 42. It will thus be seen that if it is attempted to project the contact carrier, such action will be prevented so long as the parts remain in the uncoupled position.

As the lock 4 is thrown back in coupling, the piston rod 30 is moved forward and with it the projecting pin 43. When the finger 3 starts to move, the pin 49 will of course be moved with the lever 26, permitting the arm 50 to turn, but the parts are so positioned that after a slight movement, insufficient to permit disengagement of the block 44 with the member 39, the pin 43 will engage the lever 42 and prevent further movement in that direction. In fact, the further movement of the piston rod 7 to the position shown in Fig. 3 will move the lever 42 slightly in the opposite direction, but still maintaining the interlock between the block 44 and the member 39.

When the lock 4 snaps into the locking position as shown in Fig. 4, however, the piston rod 7 is retracted by the spring 10, permitting the lever 42 to move in a counter clock-wise direction to the position shown in Fig. 8 of the drawings. The member 39 is thus rotated out of the path of the block 44 and the contact carrier is free to be thrown by admitting fluid under pressure to one of the pistons 36.

When one of the contact carriers 35 is projected, the contact carrier in the counterpart coupler is moved back thereby and the block 44 rides along the longitudinal vertical face of the projection 47, forcing the member 39 out of the way. As soon as the block 44 passes the outer end of the projection 47, the pressure of the torsional spring 48 throws the member 39 to the position shown in Fig. 8, so that the outer end of the projection 47 acts as a stop for the block 44 and thereby prevents retractive movement of the contact carrier, so that the carriers are now locked in the coupled position.

When it is desired to uncouple, fluid under pressure is supplied to the pistons 6 of the counterpart couplers and thereby the pistons are shifted outwardly. During the initial movement, by reason of the slot 8, the coupler lock 4 is not moved from the locked position, but since the projection 43 is in engagement with arm 42, said arm is rotated, so as to trip the projection 47 from engagement with the block 44. This permits the projected contact carrier to be moved rearwardly by the spring 38 acting on the retracted counterpart carrier, so that both contact carriers are returned to the neutal or release position before the coupler locks have been released.

Further movement of the piston rod 7, causes the inner end wall of the slot 30 to engage the finger 39, first pushing the lever 26 longitudinally, until the pin 27 engages the rear end wall of slot 28. By this movement, the finger 31 is moved down out of the way of the lock 4, so that said lock can move freely to the release position. When the pin 27 engages the rear end wall of slot 28, the lever 26 will be rotated and thereby the valve arm 23, so as to turn the rotary valve 17 and cut off communication through the brake pipe outlet ports.

Upon further movement of the piston rod 7, the rear end wall of slot 8 engages pin 9 and the coupler lock 4 is then rotated to effect the release of the lock, so that the coupler heads may now be separated.

After the coupler heads have been separated, the spring 10 returns the piston 6 to release position and the front end wall of the slot 30 engaging the finger 29, the same is moved so as to return the lever 26 to the normal position ready for coupling, as shown in Fig. 2 of the drawings.

During this movement, the arm 42 is allowed to move by the retraction of the pin 43, so that the projections 46 and 47 are brought into the path of movement of the block 44.

It will thus be seen that when the parts are in the uncoupled position, the contact carriers are locked against movement in either direction, the pin 49 being in position for preventing movement beyond the locking position as shown in Fig. 6.

If for any reason, the contact carriers should fail to move to release position, the coupler locks cannot be moved to release position by reason of the provision of a pawl 51 which is positioned to engage back of the projection 46 on member 39 when said member is in the locked position, as shown in Fig. 8 of the drawings, the pawl being yieldingly moved to this position by a spring 52. The pawl is arranged in the path of movement of block 44, so that when the contact carrier returns to normal release position in the usual operation, the block 44 engages the pawl 51 and throws same out of the way, so that the member 39 and finger 42 can be moved by pin 43.

If, however, the contact carrier fails to move to release position, the pawl 51 locks the projection 46 and fluid pressure supplied to piston 6 will not be effective to shift the piston rod 7 and cause the release of the coupler heads, the position of the parts under this condition being shown in Fig. 10.

A stop 53 may be provided for limiting the movement of pawl 51, so that the same cannot be moved by spring 52 into a position which might interfere with the other parts.

In the preferred construction, the carrier casing 34 is secured to a cover plate 54 which in turn is secured to the coupler head and if it is desired to remove the casing for inspection or repairs, a stop pin 55, carried by the cover plate 54, may be arranged in the path of member 39, so that when the casing is taken off, while arm 42 if freed from engagement with projection 43, the stop 55 will prevent throwing of the member 39 by the action of the spring 48.

The supply conduit closing valve may have a tappet with a substantially rectangular end, as shown in Fig. 11, or the closing valve may be made as shown in Fig. 12 where the tappet 56 is round and nearly fits the gasket opening. In this case, the tappet is provided with a central aperture 57, which communicates with passage 13 when the valve 15 is open, so that as the couplers separate, communication will be maintained open until the valve 15 seats.

If desired, the supply conduit as well as other conduits may be controlled by the rotary valve 17 instead of employing the separate closing valves.

Having now described my invention, what I claim as new and desire to secure by Letters Patent, is:

1. In a car coupler, the combination with a coupler head, a movable lock, a device for releasing said lock, and a movable contact carrier adapted to be projected into a counterpart coupler, of a block fixed to the contact carrier, a rotatable member having projections adapted to engage on opposite sides of said block for locking the carirer, and a finger carried by said member and adapted to be actuated by said releasing device.

2. In a car coupler, the combination with a coupler head, a movable lock, a device for releasing said lock, and a movable contact carrier adapted to be projected into a counterpart coupler, of a block fixedly mounted on the contact carrier, a rotatable member having projections adapted to engage on opposite sides of said block for locking the carrier in release position, a finger carried by said member and adapted to be actuated by said releasing device, and a pawl for preventing movement of said member and adapted to be released by the movement of the contact carrier.

3. In a car coupler, the combination with a coupler head containing a train pipe conduit adapted to be connected to a corresponding conduit in a counterpart coupler head, a movable lock, and a device for releasing said lock, of a valve for controlling said conduit and a lever adapted to be operated by said releasing device for controlling said valve.

4. In a car coupler, the combination with a coupler head containing a train pipe conduit adapted to be connected to a corresponding conduit in a counterpart coupler head, a movable lock, and a device for releasing said lock, of a rotary valve for controlling said conduit, a lever for operating said valve, and a finger carried by said lever and adapted to be operated by said releasing device.

5. In a car coupler, the combination with a coupler head containing a train pipe conduit adapted to be connected to a corresponding conduit in a counterpart coupler head, a movable lock, and a device for releasing said lock, of a rotary slide valve for controlling said conduit, a lever for operating said valve, a finger actuated by said releasing device for operating said valve in one direction, and a second finger carried by said lever and actuated by said lock for moving the valve in the opposite direction.

6. In a car coupler, the combination with a coupler head containing a train pipe conduit adapted to be connected to a corresponding conduit in a counterpart coupler head, a movable lock, and a device for releasing said lock, of a valve for controlling said conduit, a lever for operating said valve, a finger actuated by said releasing device in uncoupling for closing said valve, and a second finger actuated by said lock in coupling up for opening said valve.

7. In a car coupler, the combination with a coupler head containing a train pipe conduit adapted to be connected to a corresponding conduit in a counterpart coupler head, a movable lock, and a device for releasing said lock, of a valve for controlling said conduit, a lever for operating said valve, a finger actuated by said releasing device in uncoupling for closing said valve, and a second finger actuated by said lock in coupling up for opening said valve, the movement of the releasing device being adapted to shift said lever and thereby the second finger out of the path of the lock upon the release movement of said lock.

In testimony whereof I have hereunto set my hand.

THOMAS R. BROWN.

Copies of this patent may be obtained for five cents each, by addressing the "Commissioner of Patents, Washington, D. C."